US012764068B2

(12) United States Patent
Venkataraman et al.

(10) Patent No.: US 12,764,068 B2
(45) Date of Patent: Oct. 13, 2026

(54) UPDATING MULTIPLE LPM (LONGEST PREFIX MATCH) TABLES

(71) Applicant: Arista Networks, Inc., Santa Clara, CA (US)

(72) Inventors: Ganesan Venkataraman, Sunnyvale, CA (US); Chen Jia Jang, Burnaby (CA); Bhavin Rameshbhai Patel, Milpitas, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 118 days.

(21) Appl. No.: 18/985,986

(22) Filed: Dec. 18, 2024

(65) Prior Publication Data

US 2026/0172351 A1 Jun. 18, 2026

(51) Int. Cl.
*H04L 45/748* (2022.01)

(52) U.S. Cl.
CPC .................................. *H04L 45/748* (2013.01)

(58) Field of Classification Search
CPC .. H04L 45/748; H04L 45/74; H04L 45/74591
See application file for complete search history.

(56) References Cited

U.S. PATENT DOCUMENTS 7,986,696 B1 * 7/2011 Miliavisky ........ H04L 45/74591 711/108
9,049,157 B1 * 6/2015 Miliavsky ............... H04L 45/00
2004/0100950 A1 * 5/2004 Basu ..................... H04L 45/745 370/389
2006/0176721 A1 * 8/2006 Kim ....................... G11C 15/00 365/49.16
2011/0292943 A1 * 12/2011 Du ........................ H04L 45/745 370/392
2018/0109454 A1 * 4/2018 Holmberg ......... H04L 45/74591
2019/0104067 A1 * 4/2019 Ghosh ..................... G06F 3/061
2019/0280975 A1 * 9/2019 Sharif ................... H04L 45/021

* cited by examiner

*Primary Examiner* — Mohamed A. Wasel
(74) *Attorney, Agent, or Firm* — Fountainhead Law Group, PC

(57) ABSTRACT

Route updates from multiple sources are stored in a forwarding information base (FIB). An agent executing on the network device reads routes stored in the FIB and inserts them into a trie. Route groups from among the routes stored in the trie are identified based on storage capabilities of the longest prefix match (LPM) tables into which the routes will be programmed. Routes in each route group are distributed among the LPM tables according to prefix lengths, the first LPM table receives a subset of routes having the longest prefix lengths, a second LPM table receives the next subset of routes with the next longest prefix lengths, and so on.

20 Claims, 10 Drawing Sheets

UPDATING MULTIPLE LPM (LONGEST PREFIX MATCH) TABLES

BACKGROUND

The present disclosure is directed to LPM (longest prefix match) tables which are used in network devices to identify the next hop for a packet. More specifically, the present disclosure describes updating LPM tables. Generally, an IP (internet protocol) address in an incoming packet is matched against address prefixes stored in the entries of an LPM table. The packet is forwarded based on information contained in the table entry associated with the longest prefix.

Because there are limits on how much a table can store, to improve scaling, a network device can employ multiple (two or more) LPM tables and distribute the address prefixes across the LPM tables. The IP address lookup is then concurrently performed on each LPM table. The packet is forwarded based on information contained in the table entry, among matching table entries from the LPM tables, associated with the longest prefix.

Because each LPM table is updated independently of the other LPM tables, resource imbalance can arise when one LPM table fills up faster than the other table. This can result in table overflow, underutilized storage (i.e., wasted resources), and lower route scale. To reduce the imbalance, the LPM tables can be regularly monitored and storage between the two tables can be redistributed as needed to spread storage utilization evenly across the tables. Frequent updates, however, can cause significant churn among the LPM tables, resulting in degraded performance.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
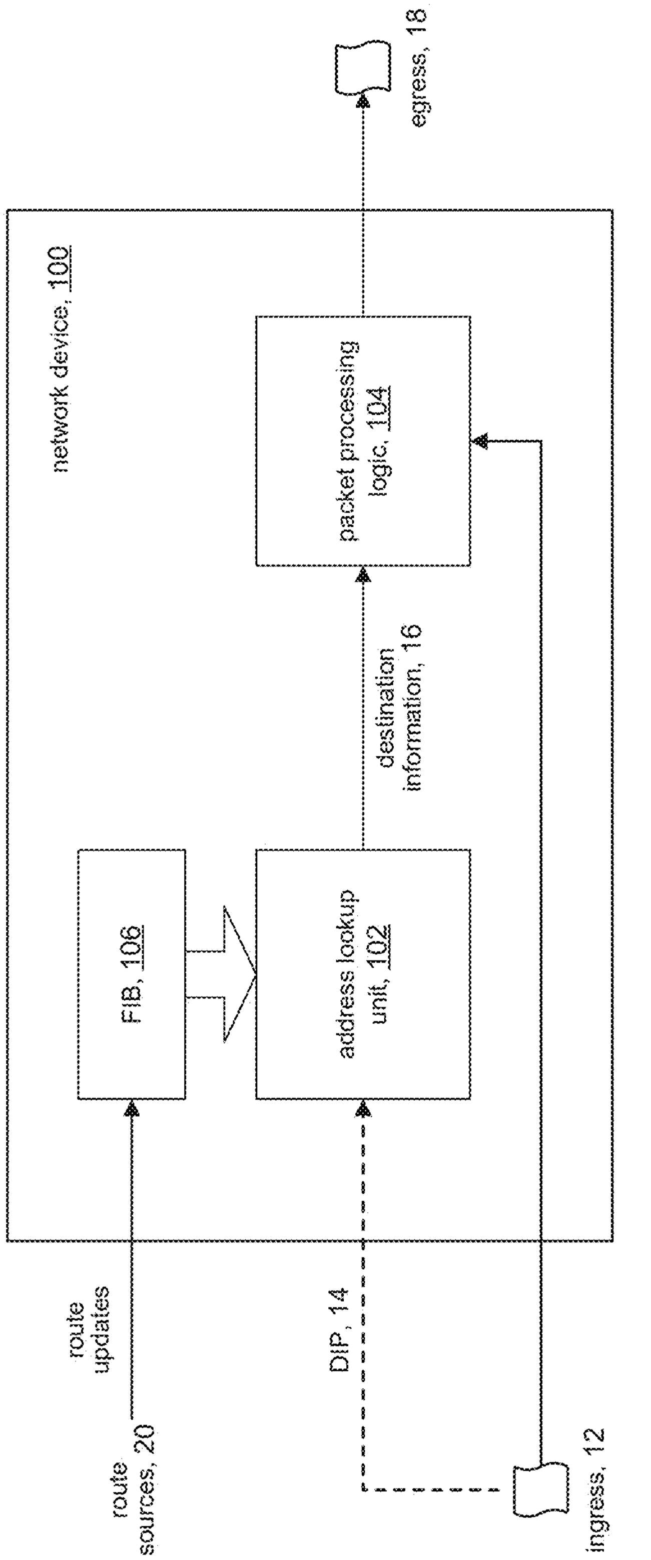
FIG. 1 is a high-level representation of a network device illustrating elements of the present disclosure.

The present disclosure is directed to updating and programming LPM (longest prefix match) tables. To improve packet forwarding scale in a network device, the network device distributes its routes across multiple LPM tables for IP (internet protocol) address lookups. The present disclosure will assume a configuration comprising two LPM tables, but it will be appreciated that embodiments in accordance with the present disclosure can readily accommodate configurations comprising more than two LPM tables.

Each LPM table comprises multiple stages. The present disclosure will assume LPM tables that are configured with two stages, but it will be appreciated that embodiments in accordance with the present disclosure can be easily extended to configurations comprising more than two stages. The first stage comprises a TCAM (ternary content addressable memory) containing a plurality of TCAM entries. The second stage comprises an ADS (associated data store) memory and a bucket data store containing rows of buckets. The ADS provides additional storage that links an entry in the TCAM to a row in the bucket data store. The LPM table can be referred to as a hardware LPM table due to the presence of the TCAM.

During IP address lookup, a TCAM entry is matched using a first portion (/n prefix) of the ingress DIP (destination IP). The matched TCAM entry is associated with a corresponding entry (pivot) in the ADS. The corresponding ADS pivot points to or otherwise references a row of buckets in the bucket data store. Each bucket in the second stage comprises a set of routes, and each route can be expressed as a <prefix, destination> pair. The remaining portion of the ingress DIP is used to identify a route with a matching prefix. The destination component of the matched route is used to get to the next hop.

Conventionally, as described above, each LPM table is programmed independently of the other LPM table. Because the LPM tables are programmed independently of each other, the route programming software has to manage resource allocation within and between LPM tables, and determine how routes are distributed among the LPM tables in order to make efficient use of the LPM tables. When overlapping routes arrive, for example, impacted sections of routes in one table should be vacated and moved to the other table to avoid mis-forwarding. Resource imbalance can arise when one LPM table fills up faster than the other table. This can result in overflow in some tables, underutilized storage (i.e., wasted resources) in other tables, and lower route scale overall. The route programming software monitors storage between the two tables and redistributes routes between tables as needed to spread storage utilization evenly across the tables. Redistribution of routes between LPM tables is a time consuming process and affects packet forwarding as the LPM tables are reprogrammed. Frequent route updates can cause significant churn among the LPM tables, thus degrading performance.

In accordance with embodiments of the present disclosure, when the routes stored in a FIB (forwarding information base) are ready to be programmed to the LPM tables, an LPM agent running on the network device creates a unified trie data structure for both LPM tables, as opposed to having two separate tries (one for each LPM table), and inserts all the routes contained in the FIB into the unified trie. Groups of routes in the trie can be selected based on the storage capacities and capabilities of the LPM tables in order to optimize storage utilization among the LPM tables. Routes in the route groups can be split across both LPM tables according to prefix length so that one LPM table is programmed with the longer prefixes and the other LPM table is programmed with the shorter prefixes.

By first storing the FIB routes in a single unified trie, the distribution of routes among LPM tables can be optimized before programming the LPM table, thus avoiding having to perform resource balancing or route redistribution on the LPM tables themselves. Embodiments in accordance with the present disclosure, results in faster LPM table updates and minimizes disruption in packet forwarding. Scaling is improved because the LPM tables are more fully utilized and routes are more balanced across LPM tables.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 is a high level diagram illustrating a network device 100 that can embody techniques in accordance with the present disclosure. In some embodiments, for example, network device 100 comprises an address lookup unit 102 and packet processing logic 104. After a (ingress) packet 12 arrives, address lookup unit 102 performs an address lookup using an address contained in the ingress packet. In some embodiments, for instance, a destination IP (DIP) address 14 contained in ingress packet 12 is used as the basis for the address lookup.

The output of the address lookup is destination information 16, which can be used to identify the next hop device. Destination information 16 can be any type information that identifies or is associated with the next hop such as a forwarding equivalence class (FEC) identifier for MPLS (multi-protocol label switching), an IP address, and so on.

Packet processing logic 104 can process ingress packet 12 according to the contents of the ingress packet and/or destination 16. Packet processing logic 104 can take appropriate action(s), including producing and forwarding egress packet 18, dropping the ingress packet, logging information, mirroring, and so on.

Network device 100 includes FIB (forwarding information base) 106 to store route updates received from various route sources 20. A "route" in the context of the present disclosure comprises the following pair:

<PFX, DEST>, where PFX is the route prefix against which an IP address is matched, and DEST is destination information used to get to the next hop.

Route sources 20 can include other network devices (not shown) that advertise route updates to network device 100, for example, using BGP (border gateway protocol) or other suitable routing protocol. Route sources 20 can include users updating routes (add, delete, modify) in the FIB via a suitable interface, and so on. Routes contained in FIB 106 can then be programmed in address lookup unit 102 in accordance with the present disclosure.

Figure 2:
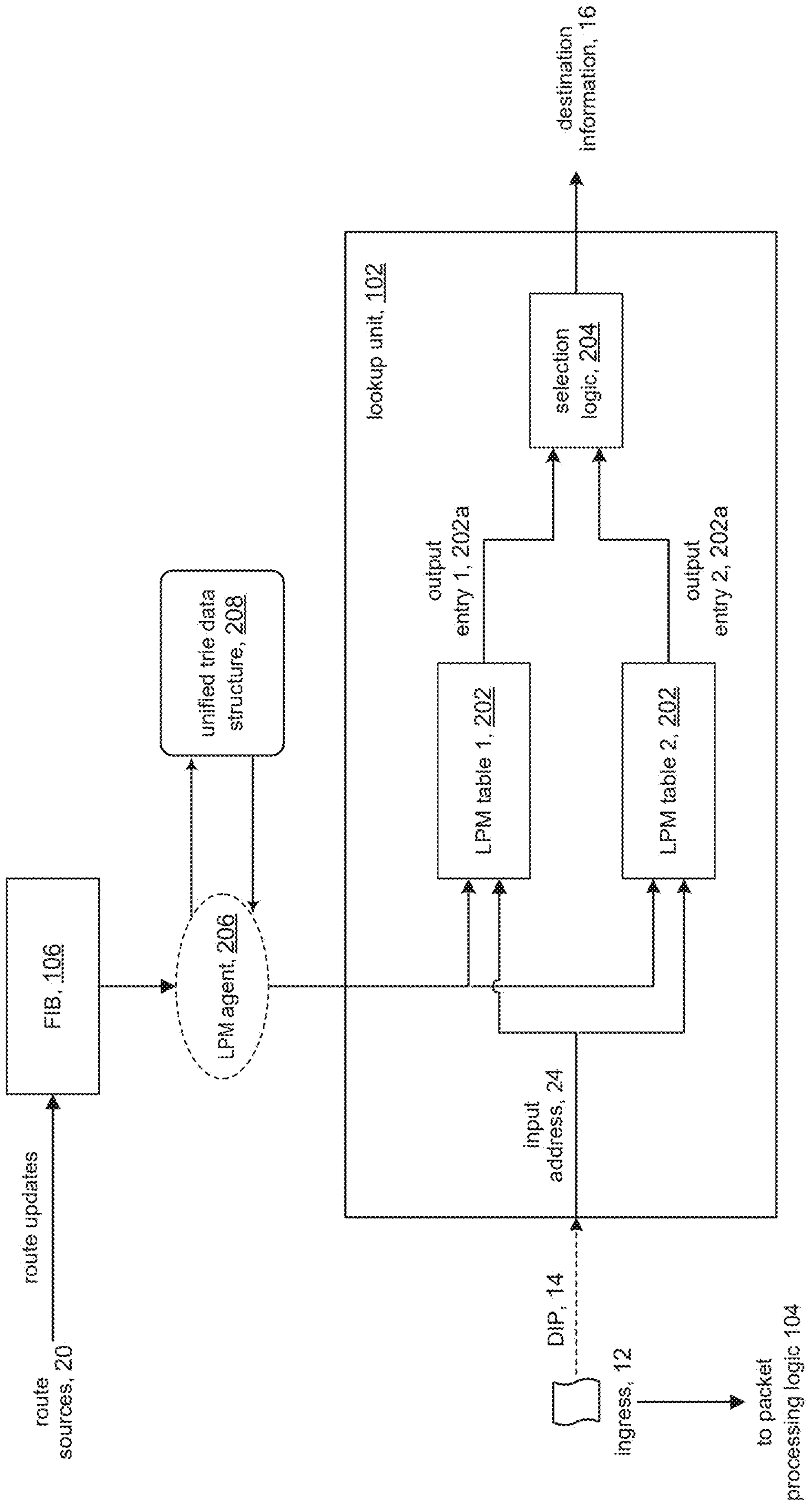
FIG. 2 is a high-level representation of a network device illustrating an embodiment in accordance with the present disclosure.

FIG. 2 shows additional details in accordance with some embodiments. As shown in FIG. 2, in some embodiments, address lookup unit 102 comprises two LPM (longest prefix match) tables 202 and selection logic 204. It will be appreciated that in other embodiments address lookup unit 102 can comprise more than two LPM tables 202. An IP address such as DIP 14 serves as input address 24 to each LPM table 202. Each LPM table 202 outputs an output entry **202*a*. The output entry 202*a* will be the entry in the LPM table 202 associated with the longest prefix that matches input address 24. If there is no match, output entry 202*a*** will be a default entry.

In accordance with the present disclosure, LPM tables 202 are programmed so that one LPM table (e.g., LPM table 1) contains the longer prefixes and the other LPM table (e.g., LPM table 2) contains the shorter prefixes. For a given input address 24, both LPM tables can have a match. Because LPM table 1 contains the longer prefixes and LPM table 2 contains the shorter prefixes, the selection logic 204 can be configured to always give the result from LPM table 1 higher priority. Otherwise, selection logic 204 can output a default.

In accordance with the present disclosure, LPM agent 206 can read routes stored in FIB 106 and store them in unified trie data structure 208. LPM agent 206 can then distribute the routes in unified trie 208 among LPM table 1 and LPM table 2. In accordance with the present disclosure, LPM agent 206 can optimize storing the routes based on available capacities and storage capabilities in LPM table 1 and LPM table 2.

Figure 3:
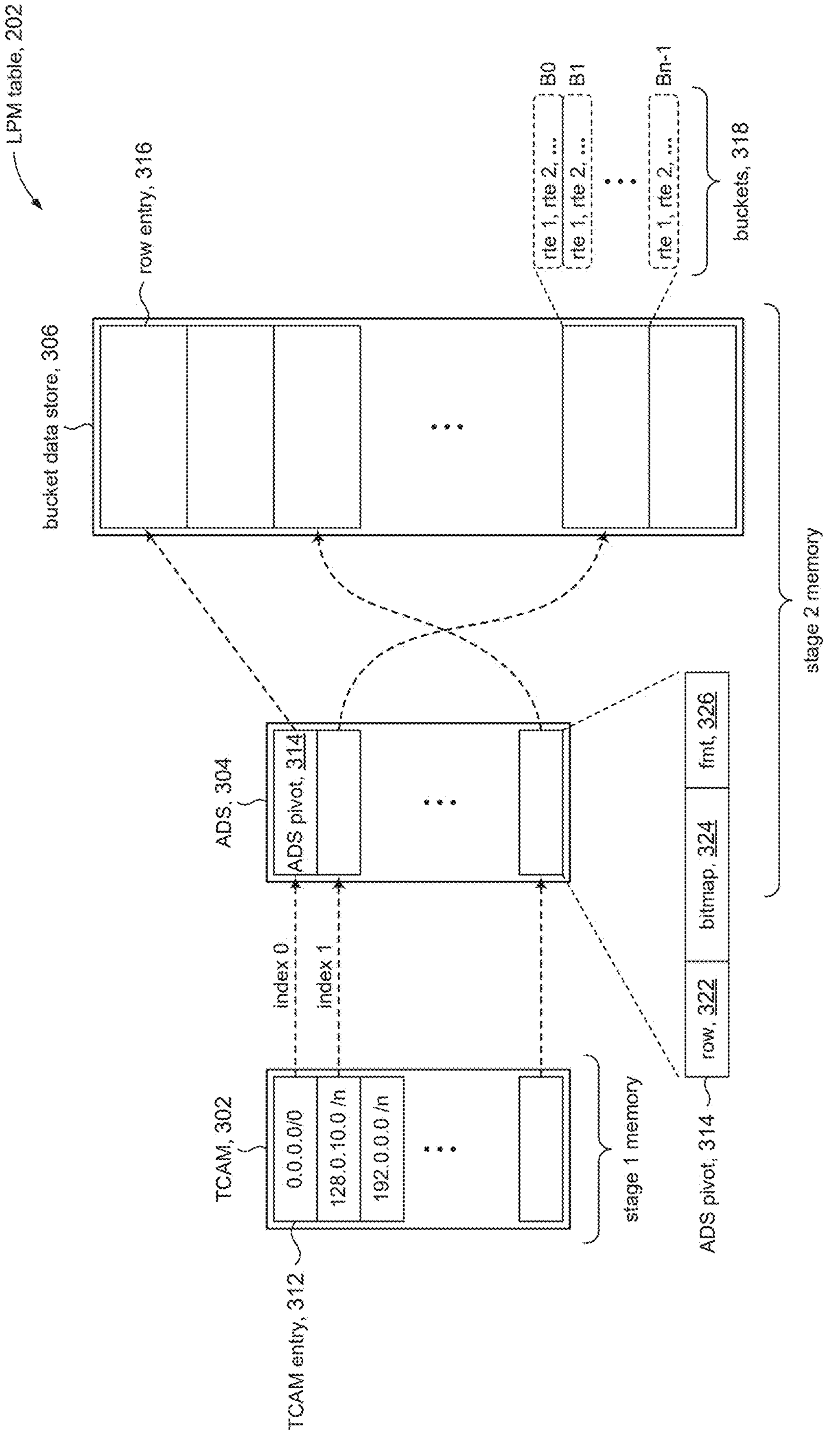
FIG. 3 illustrates a high-level representation of data tables used in the present disclosure.

FIG. 3 shows additional details of LPM tables 202. In some embodiments, LPM table 202 is a two-stage memory. The first stage memory comprises TCAM 302. The second stage memory comprises an associated data store (ADS) 304 and a bucket data store (bucket block, BB) 306. TCAM memory is specialized, expensive, and power consuming. The bucket data store serves to increase the storage capacity of TCAM memory using lower cost memory such as DRAM. Provides a link between the TCAM and the bucket data store.

TCAM 302 comprises a plurality of TCAM entries 312. Each entry stores a prefix of length n to be matched against an input address (e.g., 24, FIG. 2), where the prefix length can vary from one entry to another. An input address is matched when the first n bits of the input address matches the n bits of a prefix in the TCAM. TCAM 302 outputs an index number of the matched entry. If the input address does not match any prefix, TCAM 302 can output a default index 0.

Associated data store 304 comprises a plurality of ADS pivots 314. In accordance with some embodiments, there is a one to one correspondence between TCAM entries 312 and ADS pivots 314. In some embodiments, for example, the output index from TCAM 302 is used as an index into the ADS 304 to access a pivot 314 corresponding to a TCAM entry. Each pivot 314 comprises a row pointer 322, a bucket bitmap 324, and a format field 326. Row pointer 322 points to or otherwise identifies a row of buckets (entry) 316 in the bucket data store 306. The bucket bitmap 324 and format field 326 are explained below in connection with the bucket data store 306.

Bucket data store 306 comprises a plurality of row entries 316. Each row entry 316 comprises some number, n, of buckets 318. Each bucket 318 contains a configurable number of routes. Format field 326 indicates how many routes a bucket is configured for. Bucket bitmap 324 indicates which buckets in that row contain routes; e.g., a '0' bit can indicate the bucket is empty or otherwise unused, a '1' bit can indicate the bucket contains routes.

Figure 4:
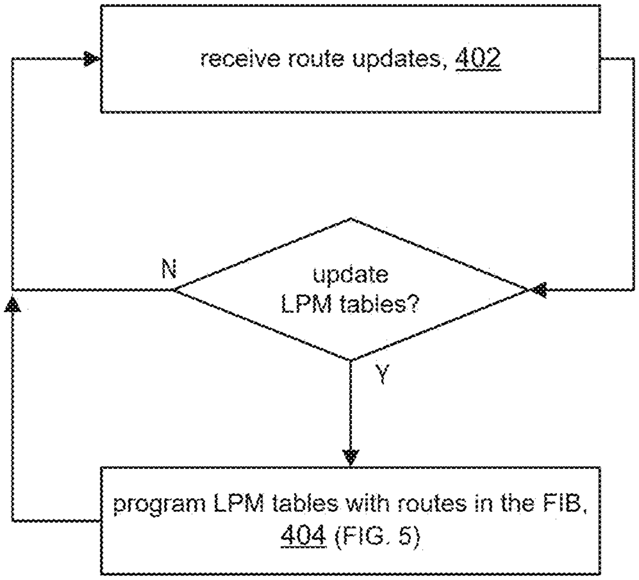
FIGS. 4 and 5 represent flows in accordance with the present disclosure.

FIG. 4 shows the basic workflow in a network device (e.g., 100) for updating LPM tables in accordance with the present disclosure. At operation 402, the network device can receive route updates, for example, from other network devices via routing protocols, from a central network controller, from a user, and so on. Route updates are accumulated in a FIB (e.g., 106). If a trigger to update the LPM tables occurs, then processing proceeds to operation 404, otherwise processing continues at operation 402. An update trigger can be a user explicitly initiating an LPM table update. The update trigger can be an automated trigger, for example a timer, when the FIB contains a predetermined number of routes (level of utilization), and so on. At operation 404, the network device can initiate processing to update the LPM tables with routes stored in the FIB. Processing can return to operation 402 to continue receiving route updates.

Figure 5:
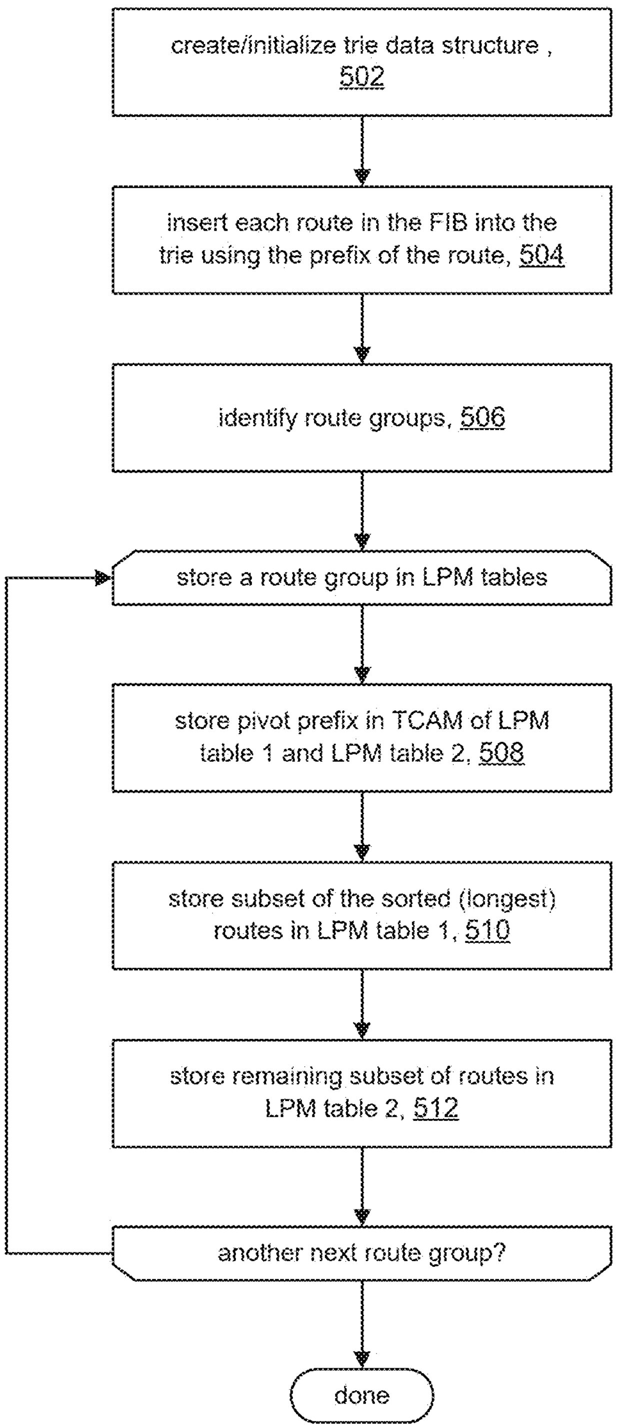

Referring to FIG. 5, the discussion will now turn to a high-level description of processing in a network device (e.g., 100, FIG. 1) for updating two or more LPM tables with routes stored in a FIB (e.g., 106) in accordance with the present disclosure. For discussion purposes, we will use two LPM tables; e.g., LPM table 1, LPM table 2, FIG. 2.

Depending on a given implementation, the processing may be performed entirely in the control plane of the network device or the processing may be divided between the control plane and the data plane. In some embodiments, the network device can include one or more processing units (circuits), which when operated, can cause the network device to perform processing in accordance with FIG. 5. Processing units (circuits) in the control plane, for example, can include general CPUs that operate by way of executing computer program code stored on a non-volatile computer readable storage medium (e.g., read-only memory); e.g., CPU 1008 in the control plane (FIG. 10) can be a general CPU. Processing units (circuits) in the data plane can include specialized processors such as digital signal processors, field programmable gate arrays, application specific integrated circuits, and the like, that operate by way of executing computer program code or by way of logic circuits being configured for specific operations. For example, each of the packet processors 1012*a*-1012*p* in the data plane (FIG. 10) can be a specialized processor.

The flow described below is a high-level representation of the operations and processing that can take place in an LPM agent (e.g., 206) running on the network device (e.g., in the control plane), in accordance with the present disclosure. The following operations/processing blocks are not necessarily executed in the order shown. Operations can be combined or broken out into smaller operations in various embodiments. Operations can be allocated for execution among one or more concurrently executing processes and/or threads, and so on.

At operation 502, the LPM agent (e.g., 206) can create/initialize a single unified trie data structure (e.g., 208) to receive routes stored in the FIB.

Figure 6:
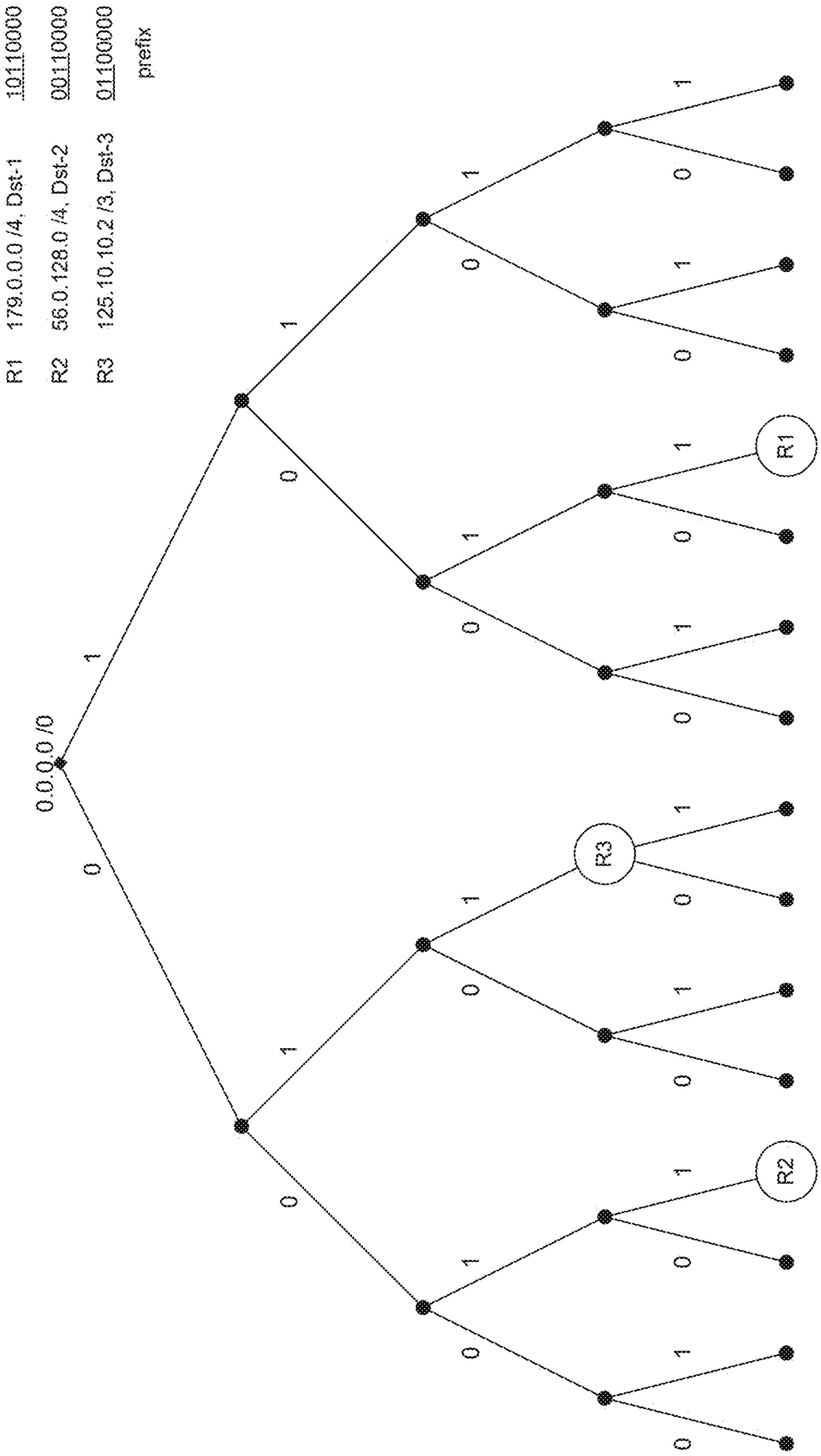
FIGS. 6 and 7 are illustrative examples of trie data structures used in accordance with the present disclosure.

At operation 504, the LPM agent can insert routes stored in the FIB (e.g., 106) into the unified trie. As explained above, routes comprise a prefix and a destination. The prefix can be expressed using slash notation; e.g., 128.0.0.0/24, 10.0.0.0/22, etc. The destination component of a route can be any information that identifies the next hop; e.g., the destination can be a FEC in MPLS. Storing routes in a trie data structure is well known and understood. Briefly, however, refer for a moment to FIG. 6 for some examples. The figure shows a general trie with three routes R1, R2, R3 inserted in the data structure. Routes R1 and R2 have /4 prefixes and route R3 has a /3 prefix. The prefix bit pattern is shown for convenience. The prefix is encoded in the pathname from the root to a child node that stores the route. For example, the prefix of R1 is "1 0 1 1", which specifies the pathname to the node that stores route R1, namely "/1/0/1/1"; likewise with R2 and R3. In general, routes can have prefix lengths from 0-32 for IPv 4 routes. It will be appreciated that a trie can be created to store IPv6 routes.

At operation 506, the LPM agent can identify a set of route groups (groups of routes) from among the routes in the unified trie to be stored in a bucket data store (e.g., 306). Identifying groups of routes stored in a trie is known and can be accomplished using known heuristics. Route groups are selected by traversing the unified trie, and the routes under the sub-tries (pivots) are grouped based on the prefix lengths and storage constraints of the bucket data store. Referring to the generalized example trie shown in FIG. 7, for instance, sub-tries are shown which represent examples of route groups A, B, and C.

The number of routes per route group depends on the number of rows in the bucket data stores of the two LPM tables, the number of buckets in each row of buckets, and the number of routes that each bucket can store. For example, suppose the bucket data store in LPM table 1 has 16K rows and 5 buckets per row and in LPM table 2 16K rows and 6 buckets per row. The routes in a route group can be selected based on a virtual bucket data store that represents a combination of the bucket data stores in LPM table 1 and LPM table 2 comprising 16K rows with 11 buckets per row. The joint allocation of buckets between LPM table 1 and LPM table 2 provides flexibility to ensure balanced use of bucket resources because the number of routes (size) of the route group can be selected to ensure that all the buckets in both LPM tables are fully utilized.

In accordance with the present disclosure, each route group in the route groups identified at operation 506 can be distributed among the LPM tables. In our example, for instance, we have two LPM tables, LPM table 1 and LPM table 2. The route group can be distributed between LPM table 1 and LPM table 2 as follows:

At operation 508, the LPM agent can store the pivot prefix associated with the route group in a TCAM entry in the TCAMs of both LPM tables. More specifically, the pivot prefix is stored in the same entry in both TCAMs. The pivot prefix of a route group is the common prefix among all the prefixes in the route group. In terms of the example trie in FIG. 7, for example, the pivot prefix for a given route group can be determined using the path from the root node of the trie to the child node of the sub-trie that contains the route group. For example, the pathname to route group A is "/0/0/0", and so the pivot prefix for route group A is "000" with a prefix length of 3; the route group has a /3 prefix. Likewise, the pivot prefix for route group B is "00" with a prefix length of 2 (/2 prefix), and the pivot prefix for route group C is "0" with a prefix length of 1 (/1 prefix).

Figure 7:
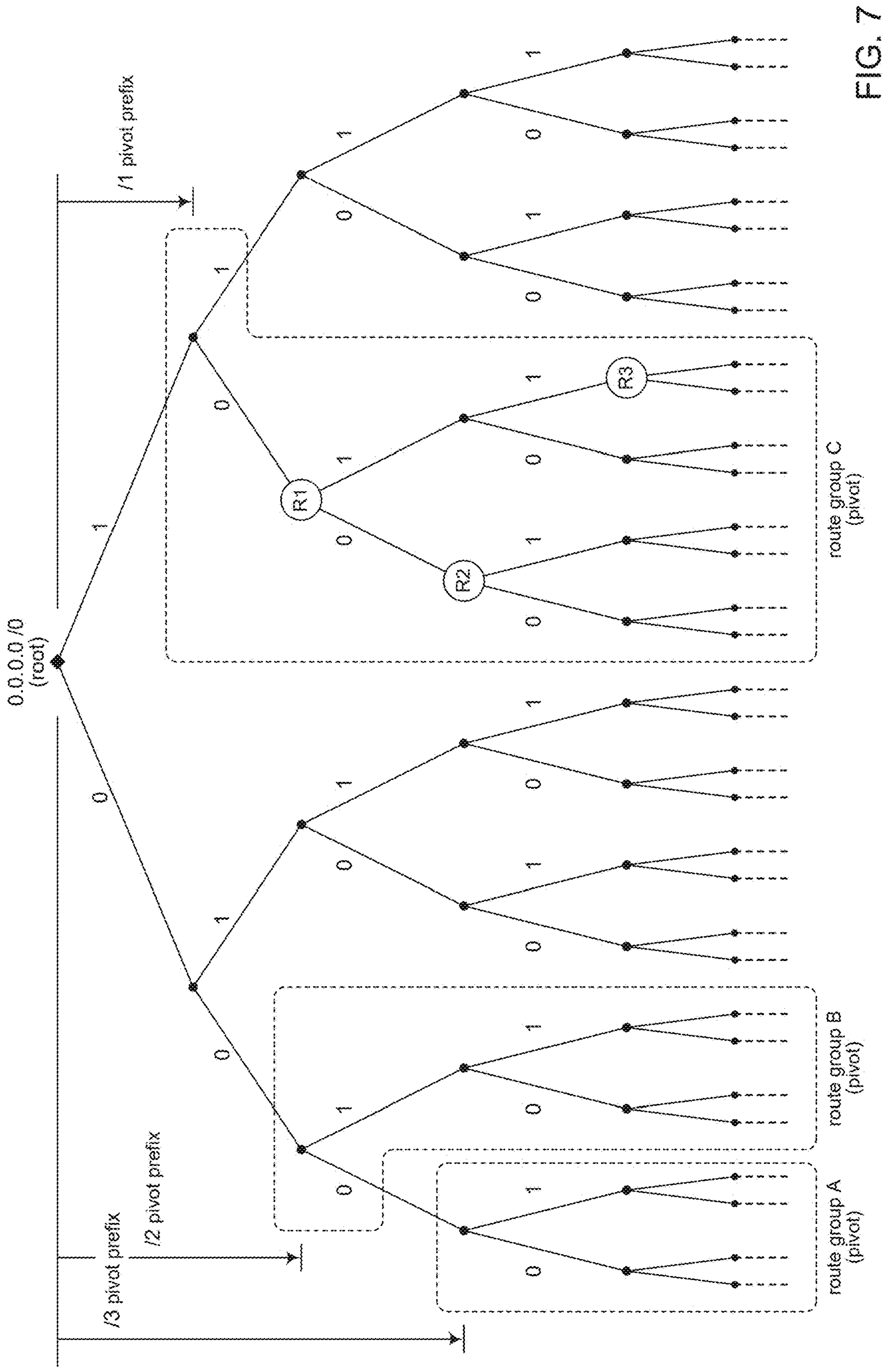

The example trie shown in FIG. 7 is greatly simplified and is provided merely for illustrative purposes. It will be appreciated that in practice, route groups can be defined further down in the trie, depending on the received route updates (e.g., FIG. 2), so that pivot prefix lengths may be longer with prefixes such as /10, /15, /20, and so on.

At operation 510, the LPM agent can store a first subset of routes in the route group having the longer prefixes into one of the LPM tables, for example, LPM table 1. For example, the routes in the route group can be sorted according to their prefix lengths in decreasing order, and the first subset of routes can be taken from the sorted routes. The first subset of routes can be stored in LPM table 1 as follows:

Allocate a row of buckets (e.g., 316, FIG. 3) from the bucket data store (e.g., 306) of LPM table 1. The first subset of routes can be stored in the buckets of the allocated row. As explained above in connection with operation 506, the size of the route group (i.e., number of routes in the route group) was selected based on storage capacities of the bucket rows in LPM table 1 and LPM table. 2. As such, the number of routes in the first subset will be the number of routes that the allocated row of buckets in LPM table 1 can hold; i.e., number of buckets per row×number of routes per bucket.

Store a pointer to the allocated row of buckets into an ADS pivot entry (e.g., 314) in the ADS (e.g., 304) of LPM table 1 that corresponds to the TCAM entry which contains the pivot prefix of the route group (operation 508 above). For example, the pointer can be stored in the row data field (e.g., 322) of the pivot entry.

Store a bitmap of the buckets which contain the first set of routes into the pivot entry. For example, the bitmap can be stored in the bitmap data field (e.g., 324) of the pivot entry.

Store a format code indicating the configuration of the buckets in the allocated row of buckets which contain the first set of routes into the pivot entry. For example, the format code can be stored in the format code data field (e.g., 324) of the pivot entry.

At operation 512, the LPM agent can store the remaining subset of routes in the route group having the shorter prefixes into the other LPM table; i.e., LPM table 2. The remaining subset of routes can be stored in LPM table 2 as follows:

Allocate a row of buckets (e.g., 316, FIG. 3) from the bucket data store (e.g., 306) of LPM table 2. As explained above in connection with operation 506, the route groups were selected based on a virtual bucket data store that represents a combination of the bucket data stores in LPM table 1 and LPM table 2. As such, the bucket row is the same for both LPM tables. The remaining subset of routes can be stored in the buckets of the allocated row. The number of routes in the remaining subset will be the number of routes that the allocated row of buckets in LPM table 2 can hold; i.e., number of buckets per row×number of routes per bucket.

Store a pointer to the allocated row of buckets into an ADS pivot entry (e.g., 314) in the ADS (e.g., 304) of LPM table 2 that corresponds to the TCAM entry which contains the pivot prefix of the route group (operation 508 above). For example, the pointer can be stored in the row data field (e.g., 322) of the pivot entry.

Store a bitmap of the buckets in the allocated row of buckets which contain the remaining set of routes into the pivot entry. For example, the bitmap can be stored in the bitmap data field (e.g., 324) of the pivot entry.

Store a format code indicating the configuration of the buckets in the allocated row of buckets which contain the remaining set of routes into the pivot entry. For example, the format code can be stored in the format code data field (e.g., 324) of the pivot entry.

After operations 508, 510, and 512, the pivot prefix is stored in an entry (the same entry) in both TCAMs in LPM table 1 and LPM table 2. The ADS entry in LPM Table 1 that corresponds to the TCAM entry points to the row of buckets in the bucket data store that contains a subset of routes in the route group having the longer prefixes. The ADS entry in LPM Table 2 that corresponds to the TCAM entry points to the row of buckets in the bucket data store that contains the remaining subset of routes in the route group.

If there is another route group to distribute, then processing continues at operation 508 to begin processing the next route group. Otherwise, updating the LPM tables with the FIB contents in accordance with the present disclosure can be deemed complete.

Figure 8:
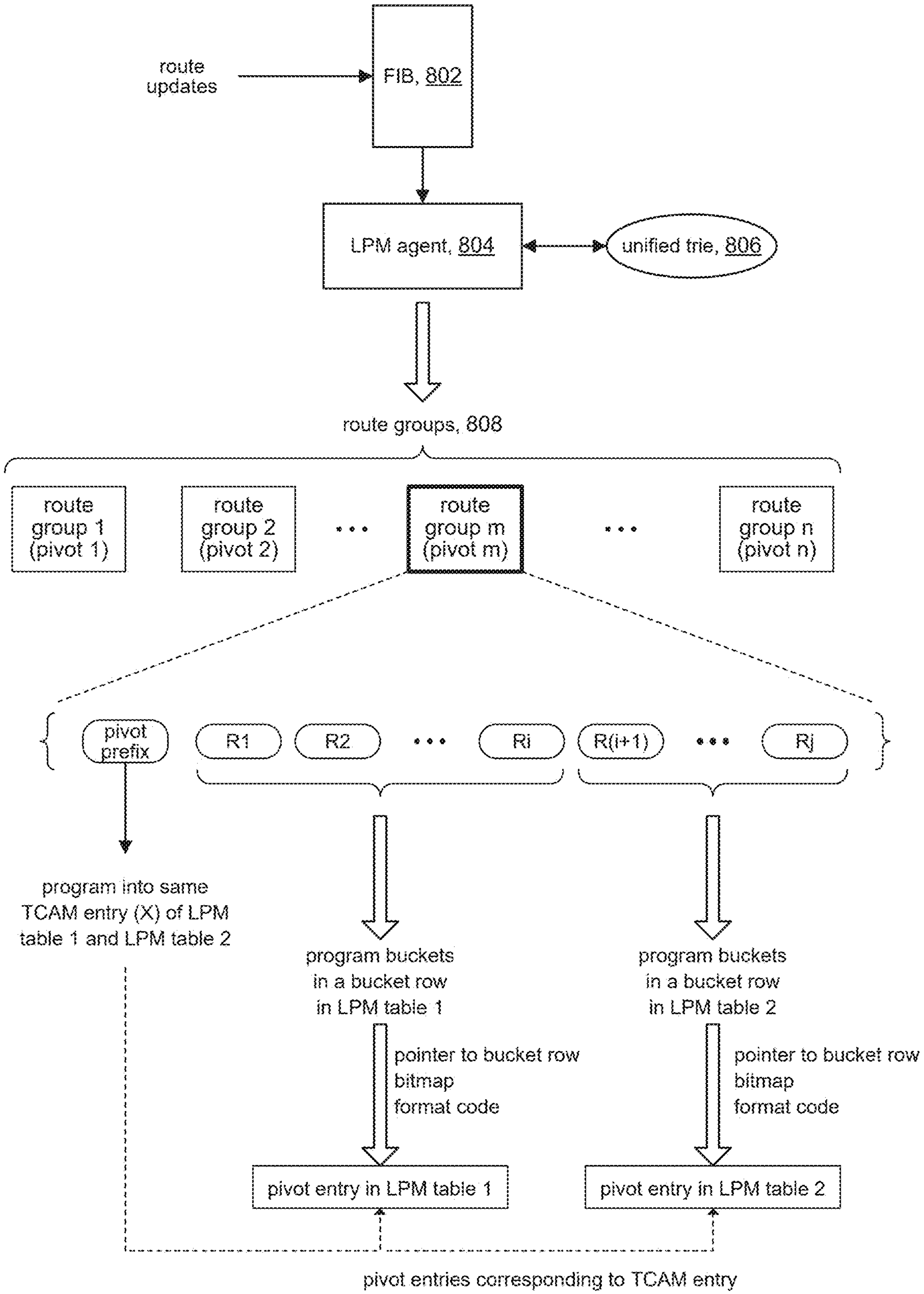
FIG. 8 represents a high-level view of processing in accordance with the present disclosure.

FIG. 8 illustrates the data flow described in FIGS. 4 and 5. FIB 802 receives route updates from external sources such as a user, other network devices (via routing protocols), central network controller, etc. LPM agent 804 reads in routes stored in FIB 802 and inserts the routes that are read in from the FIB into unified trie 806. LPM agent 804 identifies route groups 808 from among the routes stored in unified trie 806. In accordance with the present disclosure, for each identified route group, LPM 804 distributes routes in the route group between LPM table 1 and LPM table 2. As an example, FIG. 8 illustrates the distribution of routes for route group m.

The pivot prefix associated with route group m is programmed into the same TCAM entry (call it entry X) in the TCAM of LPM table 1 and the TCAM of LPM table 2. In other words, the pivot prefix is stored in TCAM entry X of LPM table 1 and in TCAM entry X of LPM table 2.

The routes in route group m can be sorted in order of their respective prefix lengths; for example, in decreasing order of prefix length where R1≥R2≥ . . . Ri≥R(i+1)≥ . . . Rj. A subset of the routes containing the longer prefixes (e.g., R1 to Ri) are stored in LPM table 1, and in particular a row of buckets in the bucket data store of LPM table 1. Likewise, the remaining subset of routes containing the shorter prefixes (R(i+1) to Rj) are stored in a row of buckets in the bucket data store of LPM table 2.

The pivot entry in the ADS of LPM table 1 that corresponds to TCAM entry X is updated with a pointer to the bucket row in LPM table 1 that contains the routes from route group m, along with a bitmap indicating which buckets in the bucket row store the routes, and the format code indicating the format of the buckets. Likewise, the pivot entry in the ADS of LPM table 2 that corresponds to TCAM entry X is updated with a pointer to the bucket row in LPM table 2 that contains the routes from route group m, along with a bitmap indicating which buckets in the bucket row store the routes, and the format code indicating the format of the buckets.

It will be appreciated that in embodiments having more than two LPM tables, the first LPM table receives a subset of the routes, comprising the longest prefixes, the second LPM table receives the next subset routes comprising the next longest prefixes, the third LPM table receives the next subset of routes, and so on.

Figure 9:
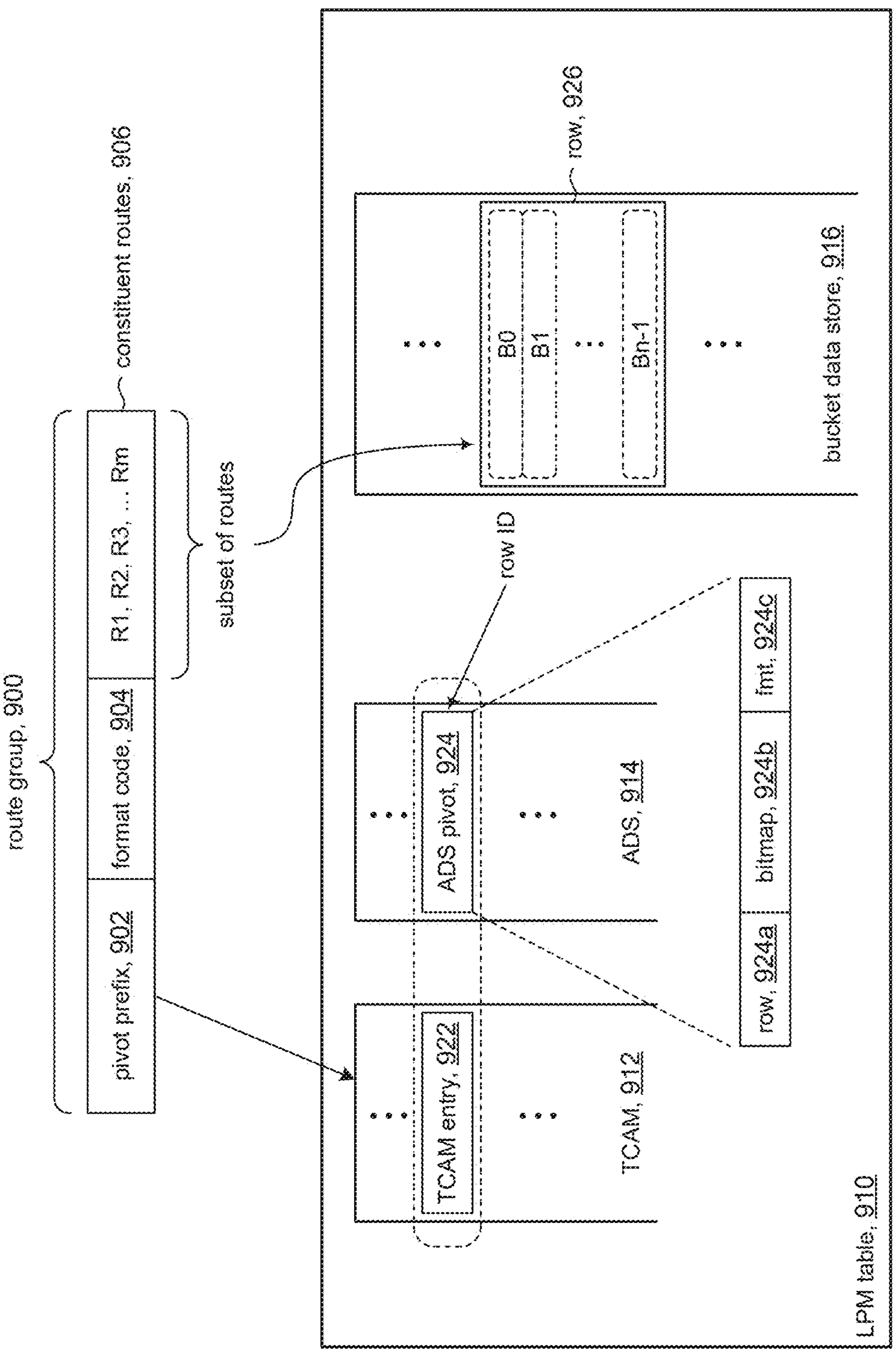
FIG. 9 illustrates an example of filling data tables in a longest prefix match table in accordance with the present disclosure.

FIG. 9 shows additional details for storing a subset of the routes in a route group in an LPM table. Route group 900 comprises a group of routes (constituent routes) 906. For example, a subset comprising the longest routes in route group 900 can be stored in one LPM table, and the remaining subset of routes in route group 900 can be stored in another LPM table.

Route group 900 is associated with pivot prefix 902 which represents the longest prefix that is common among the prefixes of routes 906. Storing route group 900 into LPM table 910 includes storing pivot prefix 902 into a TCAM entry 922 in TCAM 912 of the LPM table.

Route group 900 is further associated with a format code 904. The format code 904 can be determined at the time the route groups are identified (operation 506, FIG. 5). Recall from operation 506 that a route group is identified based on prefix lengths and storage constraints of the bucket data store. In some embodiments, the bucket data store is configurable in terms of the number of buckets a given row of buckets can be configured with and the number of routes that can be stored per bucket. Accordingly, at operation 506, in addition to identifying the routes in a route group, the configuration of buckets for storing the route can be determined. The format code 904 can encode this configuration.

A row of buckets 926 can be allocated from bucket data store 916 and configured according to format code 904. Recall from FIG. 3 that entries in TCAM 912 correspond one to one with pivot entries in ADS 914. Accordingly, the row identifier of the allocated row buckets 926 is stored in row data field 924*a* of a pivot entry 924 that corresponds to TCAM entry 922.

The subset of constituent routes 906 are stored in the buckets in the allocated row of buckets 926. A bitmap indicating which buckets in the allocated row of buckets 926 contain the subset of constituent routes 906 is generated and stored in bitmap data field 924*b* in the pivot entry 924 that corresponds to TCAM entry 922. Format code 904 is stored in format field 924*c* of pivot entry 924 to inform the lookup process how the buckets in the row of buckets 926 are formatted.

Figure 10:
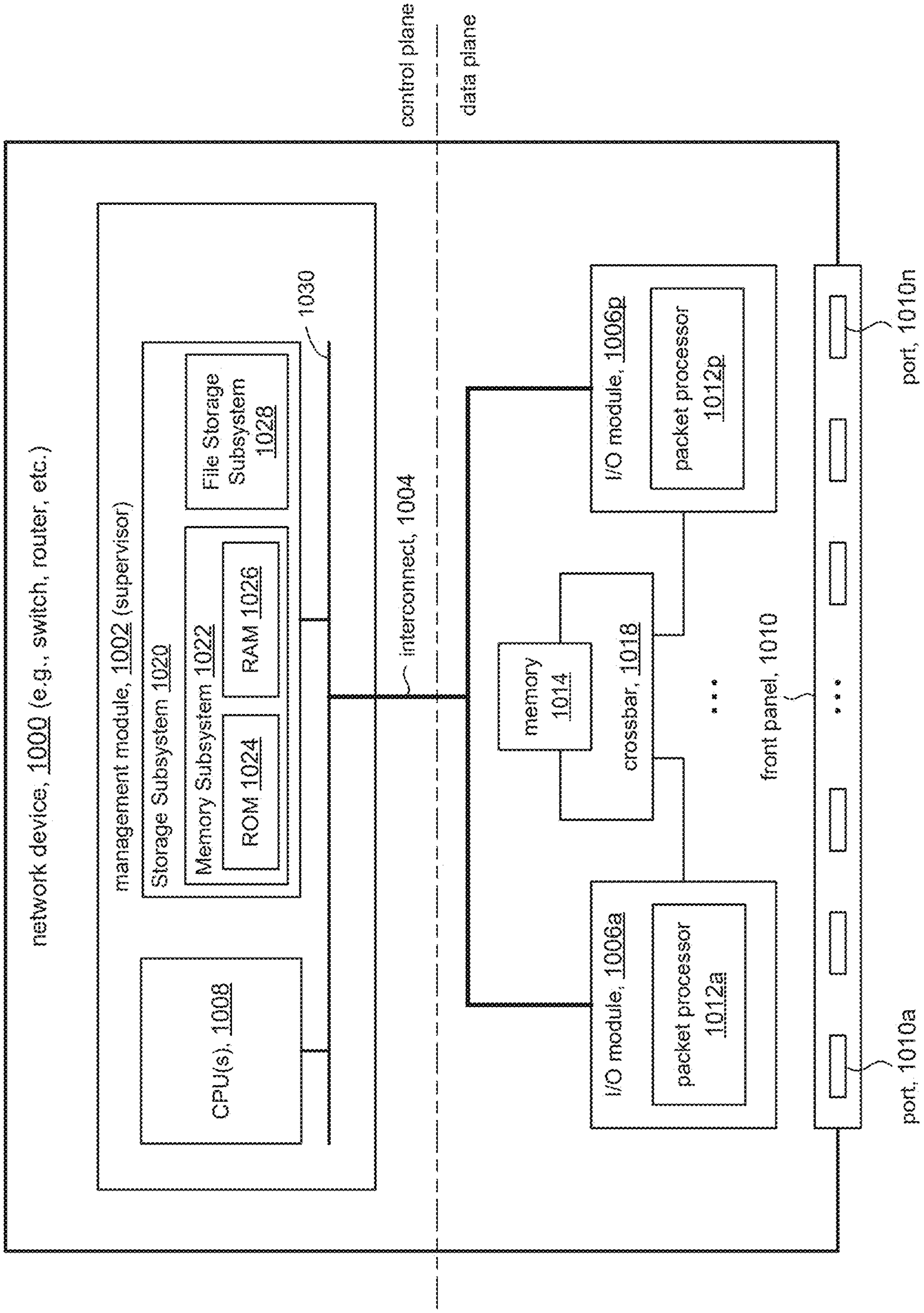
FIG. 10 illustrates details of a network device.

FIG. 10 is a schematic representation of a network device 1000 (e.g., a router, switch, firewall, and the like) that can be adapted in accordance with the present disclosure. In some embodiments, for example, network device 1000 can include one or more management modules 1002, one or more I/O modules (switches, switch chips) 1006*a*-1006*p*, and a front panel 1010 of I/O ports (physical interfaces, I/Fs) 1010*a*-1010*n*. Management module 1002 can constitute the control plane of network device 1000 (also referred to as the control layer or simply the central processing unit, CPU), and can include CPU(s) 1008 for managing and controlling operation of network device 1000 in accordance with the present disclosure. CPU(s) 1008 can be a general-purpose processor, such as an Intel®/AMD® x86, ARM® microprocessor and the like, that operates under the control of software stored in a memory device/chips such as read-only memory (ROM) 1024 or random-access memory (RAM) 1026. The control plane provides services that include traffic management functions such as routing, security, load balancing, analysis, and the like.

CPU(s) 1008 can communicate with storage subsystem 1020 via bus subsystem 1030. Other subsystems, such as a network interface subsystem (not shown in FIG. 10), may be on bus subsystem 1030. Storage subsystem 1020 can include memory subsystem 1022 and file/disk storage subsystem 1028. Memory subsystem 1022 and file/disk storage subsystem 1028 represent examples of non-transitory computer-readable storage devices that can store program code and/or data, which when executed by CPU(s) 1008, can cause CPU(s) 1008 to perform operations in accordance with embodiments of the present disclosure.

Memory subsystem 1022 can include a number of memories such as main RAM 1026 (e.g., static RAM, dynamic RAM, etc.) for storage of instructions and data during program execution, and ROM (read-only memory) 1024 on which fixed instructions and data can be stored. File storage subsystem 1028 can provide persistent (i.e., non-volatile) storage for program and data files, and can include storage technologies such as solid-state drive and/or other types of storage media known in the art.

CPU(s) 1008 can run a network operating system stored in storage subsystem 1020. A network operating system is a specialized operating system for network device 1000. For example, the network operating system can be the Arista EOS® operating system, which is a fully programmable and highly modular, Linux-based network operating system developed and sold/licensed by Arista Networks, Inc. of Santa Clara, California. It is understood that other network operating systems may be used.

Bus subsystem 1030 can provide a mechanism for the various components and subsystems of management module 1002 to communicate with each other as intended. Although bus subsystem 1030 is shown schematically as a single bus, alternative embodiments of the bus subsystem can utilize multiple buses.

The one or more I/O modules 1006*a*-1006*p* can be collectively referred to as the data plane of network device 1000 (also referred to as the data layer, forwarding plane, etc.). Interconnect 1004 represents interconnections between modules in the control plane and modules in the data plane. Interconnect 1004 can be any suitable bus architecture such as Peripheral Component Interconnect Express (PCIe), System Management Bus (SMBus), Inter-Integrated Circuit ($I^2C$), etc.

I/O modules 1006*a*-1006*p* can include respective packet processing hardware comprising packet processors 1012*a*-1012*p* (collectively 1012) to provide packet processing and forwarding capability. Each I/O module 1006*a*-1006*p* can be further configured to communicate over one or more ports 1010*a*-1010*n* on the front panel 1010 to receive and forward network traffic. Packet processors 1012 can comprise hardware (circuitry), including for example, data processing hardware such as an application specific integrated circuit (ASIC), field programmable gate array (FPGA), processing unit, and the like, which can be configured to operate in accordance with the present disclosure. Packet processors 1012 can include forwarding lookup hardware such as, for example, but not limited to content addressable memory such as ternary CAMs (TCAMs) and auxiliary memory such as static RAM (SRAM).

Memory hardware 1014 can include buffers used for queueing packets. I/O modules 1006*a*-1006*p* can access memory hardware 1014 via crossbar 1018. It is noted that in other embodiments, the memory hardware 1014 can be incorporated into each I/O module. The forwarding hardware in conjunction with the lookup hardware can provide wire speed decisions on how to process ingress packets and outgoing packets for egress. In accordance with some embodiments, some aspects of the present disclosure can be performed wholly within the data plane.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device for updating routes in at least a first LPM (longest prefix match) table and a second LPM table in the network device, the method comprising:
- receiving routes and storing the received routes in a FIB (forwarding information base); and
- updating the first and second LPM tables with routes stored in the FIB, including:
  - inserting routes stored in the FIB into a single trie data structure;
  - identifying a plurality of route groups from among the routes stored in the trie data structure, each route group comprising a corresponding plurality of routes, each route group associated with a pivot prefix determined based on prefixes of the corresponding plurality of routes; and distributing routes in each of the plurality of route groups between the first LPM table and the second LPM table, including for each route group:

storing the pivot prefix of the route group into a same entry in a first TCAM of the first LPM table and a second TCAM of the second LPM table;

sorting the plurality of routes in the route group in order of decreasing prefix lengths of the routes;

storing a first subset of the plurality of routes in the route group into a first data store of the first LPM table;

associating the entry in the first TCAM with the first subset of routes stored in the first LPM table;

storing a second subset of the plurality of routes in the route group into a second data store of the second LPM table; and associating the entry in the second TCAM with the second subset of routes stored in the second LPM table, wherein routes in the first subset of routes have longer prefixes than prefixes of routes in the second subset of routes.

2. The method of claim 1, wherein the route groups are identified based on lengths of the prefixes of the routes in the single trie data structure and storage constraints of the first and second data stores.

3. The method of claim 1, wherein the pivot prefix of a route group is a longest prefix that is common among the prefixes of the plurality of routes in the given route group.

4. The method of claim 1, wherein the first and second data stores comprise rows of buckets, the method further comprising storing the first subset of routes in a plurality of buckets in a row of buckets of the first data store; and storing the second subset of routes in a plurality of buckets in a row of buckets of the second data store.

5. The method of claim 4, wherein associating the entry in the first TCAM with the first subset of routes stored in the first LPM table includes storing an identifier of the row of buckets of the first data store into a pivot entry in an ADS (associated data structure) in the first LPM table, wherein associating the entry in the second TCAM with the second subset of routes stored in the second LPM table includes storing an identifier of the row of buckets of the second data store into a pivot entry in an ADS in the second LPM table.

6. The method of claim 5, wherein the pivot entry in the ADS in the first LPM table is associated with the entry in the first TCAM in the first LPM, wherein the pivot entry in the ADS in the second LPM table is associated with the entry in the second TCAM in the second LPM.

7. A network device comprising:

one or more computer processors; and a computer-readable storage device comprising instructions for controlling the one or more computer processors to:

receive routes and storing the received routes in a FIB (forwarding information base); and update the first and second LPM tables with routes stored in the FIB, including:

inserting routes stored in the FIB into a single trie data structure;

identifying a plurality of route groups from among the routes stored in the trie data structure, each route group comprising a corresponding plurality of routes, each route group associated with a pivot prefix determined based on prefixes of the plurality of routes; and updating the first and second LPM tables with each of the identified route groups, including for each route group:

storing the pivot prefix of the route group into a same entry in a first TCAM of the first LPM table and a second TCAM of the second LPM table; and distributing the plurality of routes in the route group between the first and second LPM tables based on lengths of the prefixes of the routes, including storing a first subset of the routes in a first data store of the first LPM table and storing a second subset of the routes in a second data store of the second LPM table.

8. The network device of claim 7, wherein the first subset of the routes in the route group comprises routes having prefixes that are longer than prefixes of the second subset of routes.

9. The network device of claim 7, wherein the route groups are identified based on lengths of the prefixes of the routes in the single trie data structure and storage constraints of the first and second data stores.

10. The network device of claim 7, wherein the pivot prefix of a route group is a longest prefix that is common among the prefixes of the plurality of routes in the given route group.

11. The network device of claim 7, wherein the first and second data stores comprise rows of buckets, wherein the computer-readable storage device further comprises instructions for controlling the one or more computer processors to:

store the first subset of routes in a plurality of buckets in a row of buckets of the first data store; and store the second subset of routes in a plurality of buckets in a row of buckets of the second data store.

12. The network device of claim 11, wherein the computer-readable storage device further comprises instructions for controlling the one or more computer processors to: store an identifier of the row of buckets of the first data store into a pivot entry in an ADS (associated data structure) in the first LPM table; and store an identifier of the row of buckets of the second data store into a pivot entry in an ADS in the second LPM table.

13. The network device of claim 12, wherein the pivot entry in the ADS in the first LPM table is associated with the entry in the first TCAM in the first LPM, wherein the pivot entry in the ADS in the second LPM table is associated with the entry in the second TCAM in the second LPM.

14. A non-transitory computer-readable storage device in a network device, the non-transitory computer-readable storage device having stored thereon computer executable instructions, which when executed, cause the network device to:

receive routes and storing the received routes in a FIB (forwarding information base); and update the first and second LPM tables with routes stored in the FIB, including:

inserting routes stored in the FIB into a single trie data structure;

identifying a plurality of route groups from among the routes stored in the trie data structure, each route group comprising a corresponding plurality of routes, each route group associated with a pivot prefix determined based on prefixes of the plurality of routes; and updating the first and second LPM tables with each of the identified route groups, including for each route group:

storing the pivot prefix of the route group into a same entry in a first TCAM of the first LPM table and a second TCAM of the second LPM table; and distributing the plurality of routes in the route group between the first and second LPM tables based on lengths of the prefixes of the routes, including storing a first subset of the routes in a first data store of the first LPM table and storing a second subset of the routes in a second data store of the second LPM table.

15. The non-transitory computer-readable storage device of claim 14, wherein the first subset of the routes in the route group comprises routes having prefixes that are longer than prefixes of the second subset of routes.

16. The non-transitory computer-readable storage device of claim 14, wherein the route groups are identified based on lengths of the prefixes of the routes in the single trie data structure and storage constraints of the first and second data stores.

17. The non-transitory computer-readable storage device of claim 14, wherein the pivot prefix of a route group is a longest prefix that is common among the prefixes of the plurality of routes in the given route group.

18. The non-transitory computer-readable storage device of claim 14, wherein the first and second data stores comprise rows of buckets, wherein the computer executable instructions, which when executed, further cause the network device to:

store the first subset of routes in a plurality of buckets in a row of buckets of the first data store; and store the second subset of routes in a plurality of buckets in a row of buckets of the second data store.

19. The non-transitory computer-readable storage device of claim 18, wherein the computer executable instructions, which when executed, further cause the network device to: store an identifier of the row of buckets of the first data store into a pivot entry in an ADS (associated data structure) in the first LPM table; and store an identifier of the row of buckets of the second data store into a pivot entry in an ADS in the second LPM table.

20. The non-transitory computer-readable storage device of claim 19, wherein the pivot entry in the ADS in the first LPM table is associated with the entry in the first TCAM in the first LPM, wherein the pivot entry in the ADS in the second LPM table is associated with the entry in the second TCAM in the second LPM.

* * * * *